US012412203B1

United States Patent
Gray et al.

(10) Patent No.: US 12,412,203 B1
(45) Date of Patent: *Sep. 9, 2025

(54) DYNAMIC GO-BAG SERVICE FOR EMERGENCY SITUATIONS

(71) Applicant: UIPCO, LLC, San Antonio, TX (US)

(72) Inventors: Emily Margaret Gray, San Antonio, TX (US); Brian Francisco Shipley, Plano, TX (US); Justin Dax Haslam, San Antonio, TX (US); Robert Wiseman Simpson, Fair Oaks Ranch, TX (US); Donnette Moncrief Brown, San Antonio, TX (US); Eric David Schroeder, San Antonio, TX (US); Michael J. Maciolek, Boerne, TX (US); Bobby Lawrence Mohs, San Antonio, TX (US); Manfred Amann, San Antonio, TX (US); Rochelle Ann Tijerina, San Antonio, TX (US); Meredith Beveridge, Golden, CO (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,158

(22) Filed: Jun. 10, 2024

Related U.S. Application Data

(60) Continuation of application No. 18/171,865, filed on Feb. 21, 2023, now Pat. No. 12,062,074, which is a
(Continued)

(51) Int. Cl.
*G06Q 30/0601* (2023.01)
*A45C 3/04* (2006.01)
(Continued)

(52) U.S. Cl.
CPC .......... *G06Q 30/0621* (2013.01); *A45C 3/04* (2013.01); *A45C 11/24* (2013.01); *A45C 13/008* (2013.01);
(Continued)

(58) Field of Classification Search
CPC ..... G06Q 30/06; G06Q 30/0601–0645; G06Q 10/087–0875; G06Q 50/10; G06Q 90/00
See application file for complete search history.

(56) References Cited

U.S. PATENT DOCUMENTS

| 3,292,748 A | 12/1966 | Rifkin |
| 4,157,134 A | 6/1979 | Stoll |

(Continued)

FOREIGN PATENT DOCUMENTS

| WO | WO2012162511 A2 | 11/2012 |
| WO | WO2020/142198 | 7/2020 |

OTHER PUBLICATIONS 4 steps to pack the perfect bugout bag. (Aug. 1, 2017). University Wire Retrieved from https://dialog.proquest.com/professional/docview/1925111067?accountid=131444 (Year: 2017).*
(Continued)

*Primary Examiner* — William J Allen
(74) *Attorney, Agent, or Firm* — Plumsea Law Group, LLC

(57) ABSTRACT

A method of providing a dynamic go-bag service to a user is described. The go-bag contains various supplies and important documents, and is configured to protect these contents during an emergency situation. In one embodiment, the method includes receiving user information from a user, including information about the user, the user's family, and the user's home or residence. Based on the received user information, the method further includes generating a customized go-bag for the user that includes contents specific
(Continued)

for the user to use in an emergency situation. The method also includes providing the customized go-bag to the user.

20 Claims, 7 Drawing Sheets

Related U.S. Application Data division of application No. 16/880,548, filed on May 21, 2020, now Pat. No. 11,651,405.

(51) Int. Cl.
A45C 11/00 (2006.01)
A45C 11/24 (2006.01)
A45C 13/00 (2006.01)

(52) U.S. Cl.
CPC .... G06Q 30/0633 (2013.01); *A45C 2011/007* (2013.01)

(56) References Cited

U.S. PATENT DOCUMENTS

| | | | |
|---|---|---|---|
| 4,790,463 A | 12/1988 | Hansen | |
| 4,966,279 A | 10/1990 | Pearcy | |
| 6,030,147 A | 2/2000 | Bowden | |
| 6,066,017 A | 5/2000 | Max et al. | |
| 8,393,450 B2 | 3/2013 | Lynch-Ringvold | |
| 8,561,212 B2 | 10/2013 | Saotome | |
| 8,674,211 B1 | 3/2014 | Palmer | |
| 9,533,744 B2 | 1/2017 | Leatherman | |
| 9,545,146 B1 | 1/2017 | King | |
| D843,723 S | 3/2019 | Pap | |
| 10,758,018 B1 | 9/2020 | Dawkins | |
| 10,817,832 B1 | 10/2020 | Agrawal | |
| 11,350,718 B2 | 6/2022 | Lecocke | |
| 11,651,405 B1 | 5/2023 | Gray | |
| 2005/0140331 A1 | 6/2005 | McQuade | |
| 2005/0240498 A1 | 10/2005 | Thaler | |
| 2007/0215663 A1 | 9/2007 | Chongson | |
| 2008/0040837 A1 | 2/2008 | King et al. | |
| 2008/0210728 A1 | 9/2008 | Bihn | |
| 2009/0279810 A1 | 11/2009 | Nobles | |
| 2010/0023484 A1 | 1/2010 | Zink | |
| 2011/0290676 A1 | 12/2011 | Kershenstein | |
| 2012/0042996 A1 | 2/2012 | Glynn | |
| 2012/0298018 A1 | 11/2012 | McCabe | |
| 2012/0325880 A1 | 12/2012 | Yu | |
| 2014/0061273 A1 | 3/2014 | Bullivant et al. | |
| 2015/0164191 A1 | 6/2015 | Hause | |
| 2015/0228174 A1 | 8/2015 | Bauer | |
| 2015/0242921 A1 | 8/2015 | Peterson | |
| 2016/0084454 A1 | 3/2016 | Svitak, Sr. | |
| 2017/0188679 A1 | 7/2017 | Jacob | |
| 2017/0262884 A1 | 9/2017 | Miller | |
| 2018/0020791 A1 | 1/2018 | Cole | |
| 2020/0320607 A1 | 10/2020 | Beauchamp | |
| 2021/0224880 A1 | 7/2021 | Scholl | |

OTHER PUBLICATIONS

Ergonomically Designed and Developed "Go-Bag" For School Children: A Survival Kit. Procedia Engineering vol. 212, 2018, pp. 651-658. https://doi.org/10.1016/j.proeng.2018.01.084 (Year: 2018).*
Non-Final Office Action Mailed on Jun. 23, 2021 for U.S. Appl. No. 16/456,136.
Final Office Action Mailed on Dec. 22, 2021 for U.S. Appl. No. 16/456,136.
Invitation to Pay Additional Fees issued Feb. 19, 2020 for PCT Application No. PCT/US2019/066700.
International Search Report and Written Opinion mailed Apr. 28, 2020 for PCT Application No. PCT/US2019/066700.
Omer Floating Dry Bag (Planet Multi Store) Apr. 2, 2017 [online] <URL: https://www.youtube.com/watch?v=GMX4wyN-EUI> 0:20-0:30.
www.readytogosurvival.com. Date range: Jan. 21, 2018-Dec. 24, 2018. [recovered from www.archive.org] (Year: 2018).
Non-Final Office Action Mailed on Jul. 11, 2022 for U.S. Appl. No. 16/880,548.
Extended Supplementary European Search Report dated Aug. 10, 2022 in European Patent Application 19907857.7.
Office Action mailed Nov. 14, 2022 in U.S. Appl. No. 17/587,583.
Non-Final Office Action mailed Jan. 25, 2024 for U.S. Appl. No. 18/738,158.

* cited by examiner

DYNAMIC GO-BAG SERVICE FOR EMERGENCY SITUATIONS

CROSS-REFERENCE TO RELATED APPLICATIONS

This application is a continuation of U.S. patent application Ser. No. 18/171,865, filed Feb. 21, 2023 and titled "Dynamic Go-Bag Service for Emergency Situations", which application is a division of U.S. patent application Ser. No. 16/880,548, filed May 21, 2020 and titled "Dynamic Go-Bag Service for Emergency Situations", the disclosures of which applications are incorporated by reference herein in their entirety.

TECHNICAL FIELD

The present disclosure generally relates to containers, and in particular, to a service for providing and updating bags that can protect their contents during emergency situations.

BACKGROUND

Severe weather, natural disasters, fires and other extreme conditions can force the evacuation of large numbers of people. Often, people are unprepared for evacuation, and in the urgent rush to evacuate with family members and pets, important objects and documents can be left behind and eventually destroyed. There is a need in the art for a container that can protect valuables and important documents during an emergency situation.

SUMMARY

In one aspect, a method of providing a dynamic go-bag service to a user is provided. The method includes receiving user information from a user, including information about the user, the user's family, and the user's home or residence. Based on the received user information, the method further includes generating a customized go-bag for the user that includes contents specific for the user to use in an emergency situation. The method also includes providing the customized go-bag to the user.

In another aspect, a method of providing a dynamic go-bag service to a user is provided. The method includes determining whether any user information associated with a user has changed. The user information includes at least information about the user, the user's family, and the user's home or residence. Upon determining at least one change in the user information, the method also includes generating an updated list of supplies or items to be included in the contents of an updated go-bag for the user. The method includes comparing the updated list of supplies or items to contents of a go-bag previously provided to the user to determine one or more updated supplies or items. The method further includes providing the one or more updated supplies or items to the user.

In another aspect, a system for providing a dynamic go-bag service to a user is provided. The system includes a computing system including at least one processor. The at least one processor is in communication with a communication network. The at least one processor is configured to receive user information from a user through the communication network, including information about the user, the user's family, and the user's home or residence. Based on the received user information, the at least one processor is also configured to generate a customized go-bag for the user that includes contents specific for the user to use in an emergency situation. The at least one processor is also configured to provide the customized go-bag to the user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

As described herein, a container is provided that can store and protect valuables and important documents during an emergency situation, referred to as a "go-bag". Emergency situations can refer to situations that are caused by natural disasters such as hurricanes or wildfires. Various embodiments of the go-bag may allow a user to safely transport items. In some instances, an emergency situation may cause an unsafe environment such as flooding or fires. Embodiments of a go-bag may allow the transported items to remain protected from water and/or fire. Other emergency situations may leave a user with no electrical power or access to electronic necessities. In some embodiments, the go-bag may provide electrical power to electronic devices. In some situations where flooding may occur, some embodiments of a go-bag may provide a waterproof vessel for items to remain dry and float. In other embodiments, the vessel may float in a predetermined orientation so that the go-bag can continue to generate electrical power for a user. In some embodiments, a go-bag may include identification features so that the go-bag can be returned to its owners.

According to the techniques of the present embodiments, a method and system for generating a customized go-bag and maintaining and/or updating the contents of the go-bag are provided. In some embodiments, a customized go-bag may be replaced with a new customized go-bag that includes contents reflecting a change in circumstances or other factors associated with a user. In some embodiments, one or more items in the contents of a go-bag may be replaced, updated, changed, or otherwise modified based on one or more criteria. In some cases, the criteria may be time-based. In other cases, the criteria may be based on changes in a user's circumstances or other factors associated with the user. With these techniques, a user's go-bag may be maintained or updated to remain relevant to the current needs and circumstances of the user.

Figure 1:
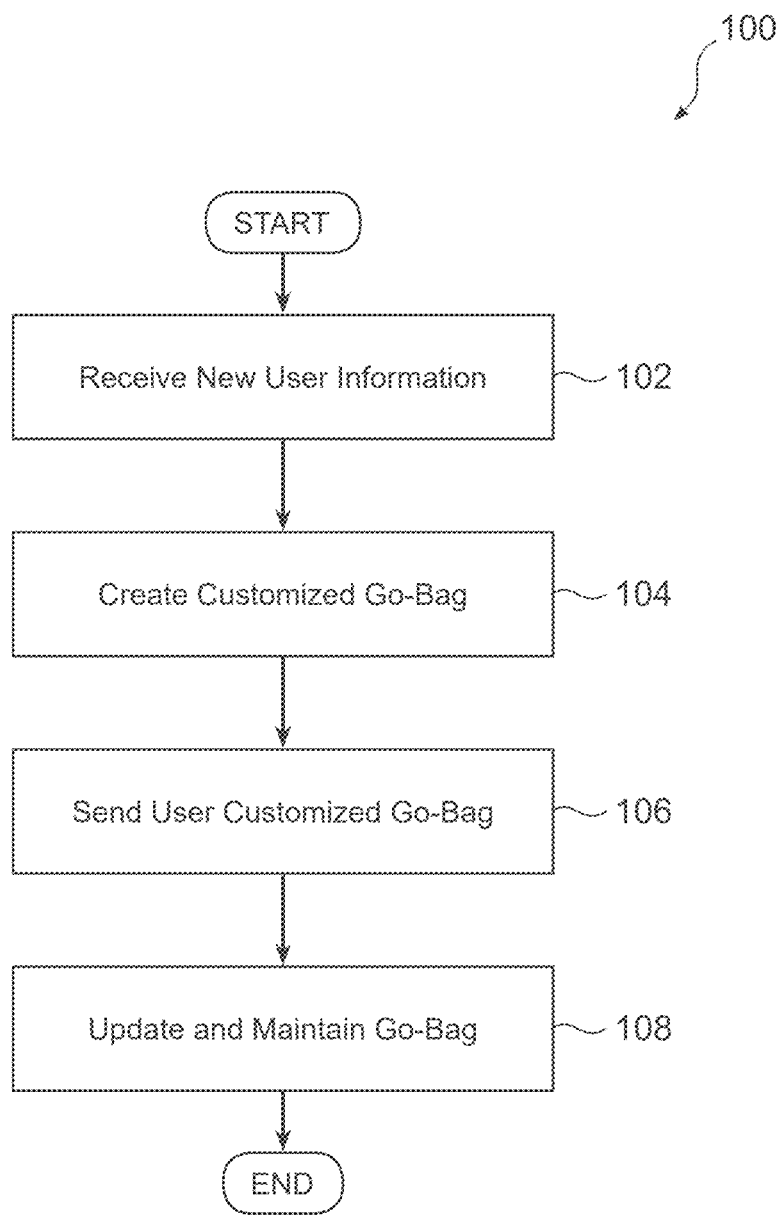
FIG. 1 is a flowchart of a method of generating and updating a go-bag, according to an example embodiment.

FIG. 1 illustrates a flowchart of a method 100 of generating and updating a go-bag, according to an example embodiment. In some embodiments, method 100 may be associated with a service, for example, a dynamic go-bag service to provide users with a customized go-bag for use in emergency situations. In an example embodiment, method 100 may be implemented by a computing system that includes at least one processor. In this embodiment, method 100 begins with an operation 102, where information associated with a new user is received. For example, operation 102 may include setting up a new user account with a service provider, such as a provider of a dynamic go-bag service. In one embodiment, the service provider may be an insurance company. In other embodiments, the service provider may be any party or entity configured to provide the dynamic go-bag service.

Additionally, operation 102 may further include requesting and receiving information associated with the new user, including, for example, information about the user's family (e.g., number of family members, ages, genders, clothing sizes, special conditions, etc.), information about the user's home or residence (e.g., geographic region, location, address, number of floors, dwelling type, connected utilities, etc.), as well as other information about the user and/or the user's family (e.g., documents, pets, allergies, medications, etc.). For example, in some embodiments, operation 102 may include providing a menu or other interface that allows the user to provide the information to the service provider. In some embodiments, operation 102 may also be implemented for existing users to allow the existing users to provide new or additional information that may be used by the service provider.

Next, method 100 includes an operation 104 where a customized go-bag is created or generated for the user. For example, at operation 104, the customized go-bag may be created or generated based on the user information received at operation 102. That is, the contents of the go-bag are customized specifically to the circumstances and needs of a particular user based on the information provided at operation 102. In general, the contents of a go-bag may include a variety of different items that are selected to be useful to a user in an emergency situation. Examples of a go-bag that may be created or generated include any embodiments or combinations of embodiments of a go-bag described in co-pending and commonly-owned U.S. patent application Ser. No. 16/456,136, filed on Jun. 28, 2019 and titled "Go-Bag for Emergency Situations" now issued as U.S. Pat. No. 11,350,718, the disclosure of which application is hereby incorporated by reference in its entirety (referred to herein as the "Go-Bag Application").

Method 100 further includes an operation 106, where the customized go-bag created at operation 104 is sent to the user. For example, the customized go-bag may be created or generated at one location as part of operation 104 and then sent to the user at another location, such as the user's home or residence. In addition, in some embodiments, the location at which the customized go-bag is created or generated may be located remotely from the location of the computing system or other processor that is configured to implement method 100. For example, the customized go-bag may be created or generated, including assembling the customized items in the contents of the go-bag, at one or more different locations. In some cases, the go-bag itself (i.e., the container) may be manufactured in one location and the contents (i.e., the customized items inside the go-bag) may be assembled at another location. With this arrangement, users in different geographic regions may receive their customized go-bags from locations that are located within geographic proximity of the user.

Next, method 108 includes an operation 108. At operation 108, the go-bag sent to the user at operation 106 is updated and/or maintained. In various embodiments, the customized go-bag may be updated and/or maintained as part of operation 108 in different ways. For example, in one embodiment, the customized go-bag may be updated and/or maintained by sending the user a new customized go-bag with replaced, updated, changed, or otherwise modified contents. In other embodiments, the customized go-bag may be updated and/or maintained by providing replacement or updated items that may be added or exchanged with items in the existing customized go-bag.

In the various embodiments, the customized go-bag is updated and/or maintained at operation 108 to reflect a change in circumstances or other factors associated with a user, the user's family, or any of the information provided by the user as part of operation 102 and/or may also be updated based on one or more other criteria, such as time-based criteria (e.g., expiration dates of medicine or food, best-by dates of batteries or other items, etc.), weather-related criteria (e.g., items relevant during hurricane season, items relevant during winter or snowstorm season, etc.), or other criteria that may necessitate different items useful for emergency situations. With these techniques, a user's go-bag may be maintained or updated to remain relevant to the current needs and circumstances of the user.

Figure 2:
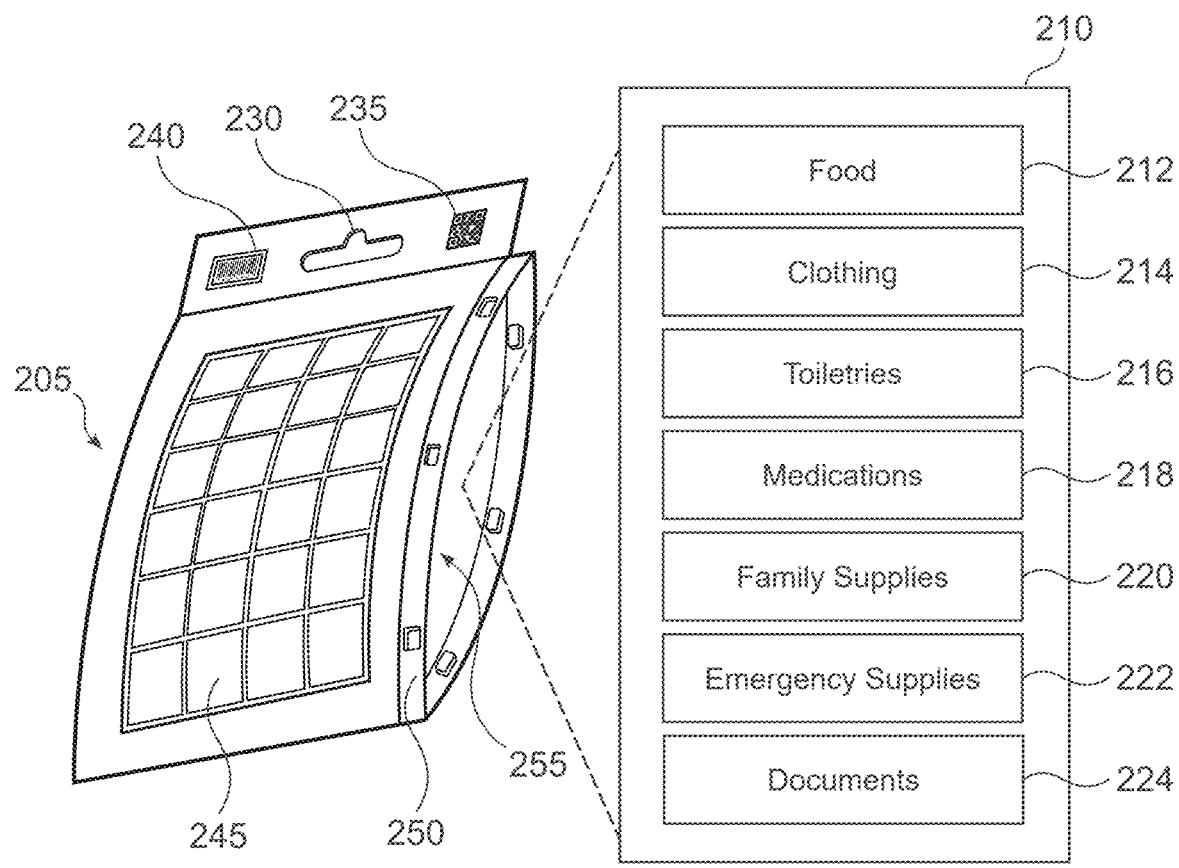
FIG. 2 is a schematic view of an example embodiment of a go-bag, including a view of representative contents.

FIG. 2 illustrates a schematic view of an example embodiment of a go-bag 205, including a view of representative contents 210 contained therein. In some embodiments, the form and/or shape of go-bag 205 may vary depending on the particular needs of a user and/or contents 210. For example, while go-bag 205 is illustrated in this embodiment in the form of a generally rectangular bag joined or sealed along the edges, a go-bag according to various embodiments may take any shape or form, including any of the forms and/or shapes described in the Go Bag Application, incorporated by reference above.

In an example embodiment, go-bag 205 includes representative contents 210 that have been customized for a particular user. For example, go-bag 205 may include contents 210 customized according to method 100, described above (e.g., created at operation 104 based on the information received for a user as part of operation 102). Contents 210 of go-bag 205 include a variety of different items that may be useful to a user in an emergency situation.

In this embodiment, contents 210 include food 212 (e.g., energy/protein bars, canned food, dried fruit, etc.), clothing 214 (e.g., one or more changes of clothing for the user and/or other family members, extra socks, shirts, undergarments, etc.), toiletries 216 (e.g., sanitizing wipes or other products, tissues, toothbrushes, toothpaste, deodorant, eye drops, etc.), medications 218 (e.g., over-the-counter medicines, painkillers, disinfectants, allergy or cold medicines, antihistamines, epi-pens, as well as prescription medicines for the user and/or the user's family, or other medicines or medications), family supplies 220 (e.g., baby formula, diapers, pet food, etc.), emergency supplies 222 (e.g., flares, flashlights, mirrors, matches, blankets, bandages, etc.), and documents 224 (e.g., identification, insurance cards, wills, passports, birth certificates, lists of contacts, photos, mortgage, other important financial or personal documents, etc.). It should be understood that the specific items included in contents 210 shown in FIG. 2 are merely exemplary and the exact items included in each customized go-bag will be specific to the particular user.

As shown in FIG. 2, go-bag 205 includes a number of exemplary features which may vary depending on the particular arrangement of a customized go-bag. In this embodiment, go-bag 205 includes a handle 230. Handle 230 is configured to allow go-bag 205 to be easily and conveniently grabbed and held by a user in an emergency situation. As shown in FIG. 2, handle 230 is integrally formed as a cut-out portion of a tab along a top of go-bag 205.

In some embodiments, go-bag 205 may also include one or more identification features disposed on its exterior surface. The identification features may allow a user to identify go-bag 205 if lost or separated from the user. Examples of an identification feature can include a quick response (QR) code 235, a barcode 240, or a numerical code that can identify the user of go-bag 205. In other embodiments, any other kind of identifier or indicia could be used with go-bag 205 as an identification feature. In this embodiment, the identification features are disposed on a portion of a tab along a top of go-bag 205, including QR code 235 and barcode 240. In other embodiments, the identification features may be located on other portions of go-bag 205. Some embodiments of go-bag 205 can include multiple identification features. For example, as shown in FIG. 2, two identification features or marks are illustrated (i.e., QR code 235 and barcode 240). Other embodiments may include only one identification mark or feature or may not include any identification features.

As described in the Go Bag Application, incorporated by reference above, go-bag 205 may include any number of features, including, but not limited to an airtight and/or waterproof seal to protect the contents of the go-bag, provisions that protect the contents in high temperature or fire conditions (e.g., flame or fire resistant material layers), provisions to increase the buoyancy of the go-bag in water (e.g., buoyant or inflatable layers), provisions that can provide electrical power, self-orienting features, locking features, tracking features, etc.

In this embodiment, go-bag 205 includes a solar panel 245 disposed on an outside surface of the bag that can provide electrical power to an interior void or space 255 of go-bag 205. In some embodiments, an electrical conductor can extend from solar panel 245 to the interior void 255 of go-bag 205. The electrical conductor can be placed in any desired or suitable location within interior void 255. Any suitable mechanical connection may be provided to connect an electronic device to the electrical conductor. In some cases, a universal connector, such as a USB connector, may be provided to electrically connect an electronic device or external battery pack to the electrical conductor to receive electricity from solar panel 245.

In this embodiment, go-bag 205 also includes include a seal 250 that can enclose interior void or space 255 from the external environment. Some embodiments of go-bag 205 may include a seal 250 with components that provide a releasable closing system that can selectively join go-bag 205 along an edge. In some embodiments, seal 250 can be a waterproof seal.

Figure 3:
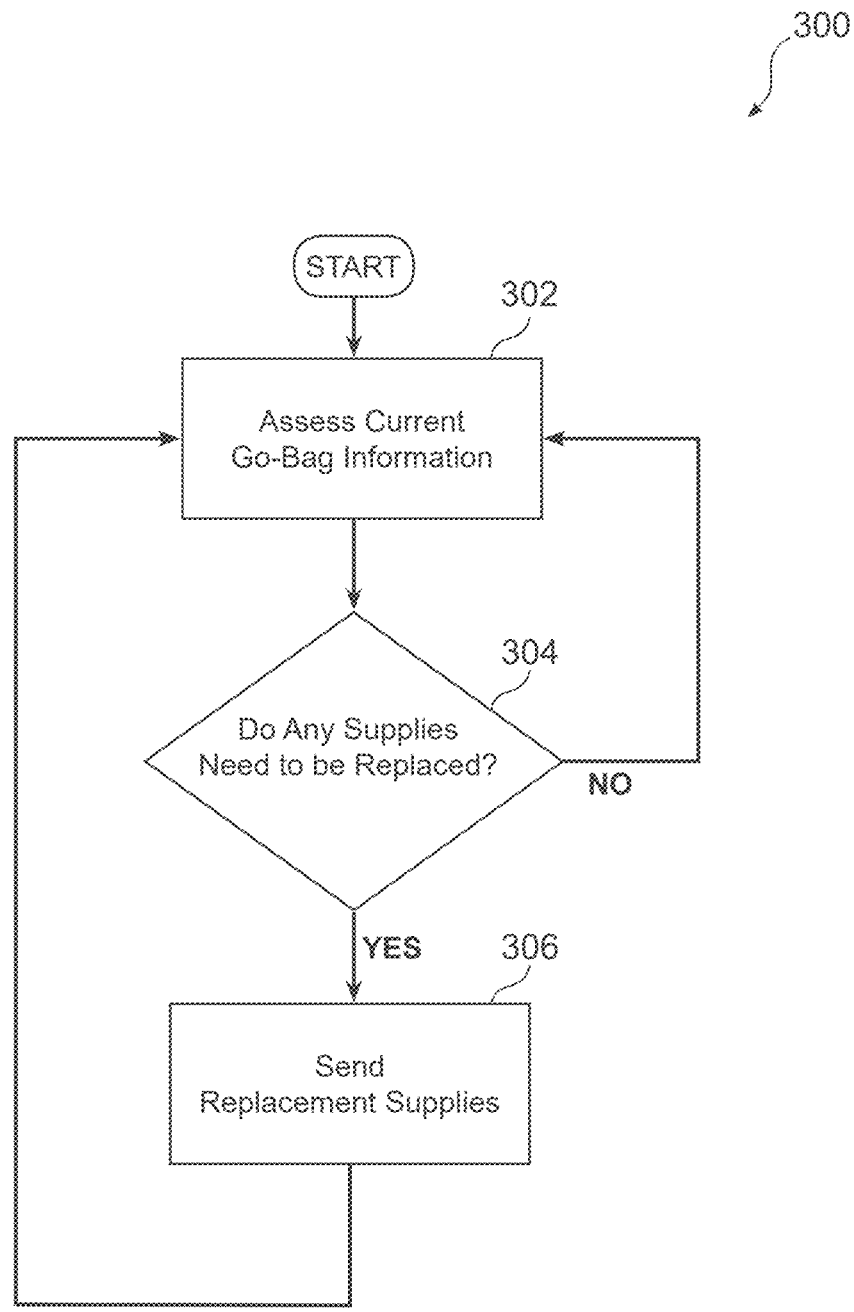
FIG. 3 is a flowchart of a method of updating a go-bag, according to an example embodiment.

Referring now to FIG. 3, a flowchart of a method 300 of updating a go-bag is shown according to an example embodiment. In some embodiments, method 300 may be associated with a service, for example, a dynamic go-bag service to update and/or maintain a customized go-bag for a user to use in emergency situations. In an example embodiment, method 300 may be implemented by a computing system that includes at least one processor. In this embodiment, method 300 begins at an operation 302. At operation 302, the current information associated with a go-bag is assessed. For example, at operation 302, information about contents 210 of go-bag 205 may be assessed. Assessing the contents of the go-bag may include determining if any of the contents are time-sensitive (e.g., have expiration dates or best-by dates), are based on outdated information (e.g., due to changes in a user's family situation, such as number of family members, pets, clothing sizes, ages of family members, allergies, etc.), and/or are no longer required or useful due to other changes in circumstances associated with a user (e.g., change in home or residence, changes to important documents, etc.).

Next, method 300 includes an operation 304. At operation 304, whether or not any of the supplies or contents of the go-bag need to be replaced is determined. For example, based on the assessment made at operation 302, one or more items included in contents 210 of go-bag 205 may be determined to need replacing. Upon determining at operation 304 that none of the supplies in the go-bag need to be replaced or updated (e.g., the determination at operation 304 is "NO"), then method 300 may proceed back to operation 302 where the information associated with the go-bag may be assessed again at some later time. For example, the information associated with the go-bag may be assessed on a predetermined basis, such as a periodic time period (e.g., monthly, quarterly, yearly, etc.), and/or may be assessed based on information indicative of a change in circumstances associated with a user (e.g., a birth, death, move, job change, etc.).

Upon determining at operation 304 that at least one of the items or supplies included in the go-bag does need to be replaced or updated (e.g., the determination at operation 304 is "YES"), then method 300 may proceed to an operation 306. At operation 306, one or more of the items or supplies that were determined to need to be replaced at operation 304 are sent to the user. In some embodiments, the replacement items or supplies may be sent to the user directly from the service provider (i.e., the dynamic go-bag service). In other embodiments, the replacement items or supplies may be sent to the user directly from one or more third-party providers on behalf of the service provider, for example, from retail merchants or other entities that manufacture, distribute, and/or sell various items or supplies that may be included in the user's go-bag.

In some embodiments, when the user receives the replacement items or supplies for the go-bag as a result of operation 306, the user may update the contents of the user's go-bag with the replacement items or supplies. For example, the user may replace or more items of contents 210 of go-bag 205, with the replacement items or supplies received based on method 300. In other embodiments, operation 306 may include generating and sending the user a new go-bag that includes the replacement items or supplies, along with the other contents of the previous go-bag. With this arrangement, a user's go-bag may be automatically maintained or updated by the service provider so that the go-bag remains relevant to the current needs and circumstances of the user.

Figure 4:
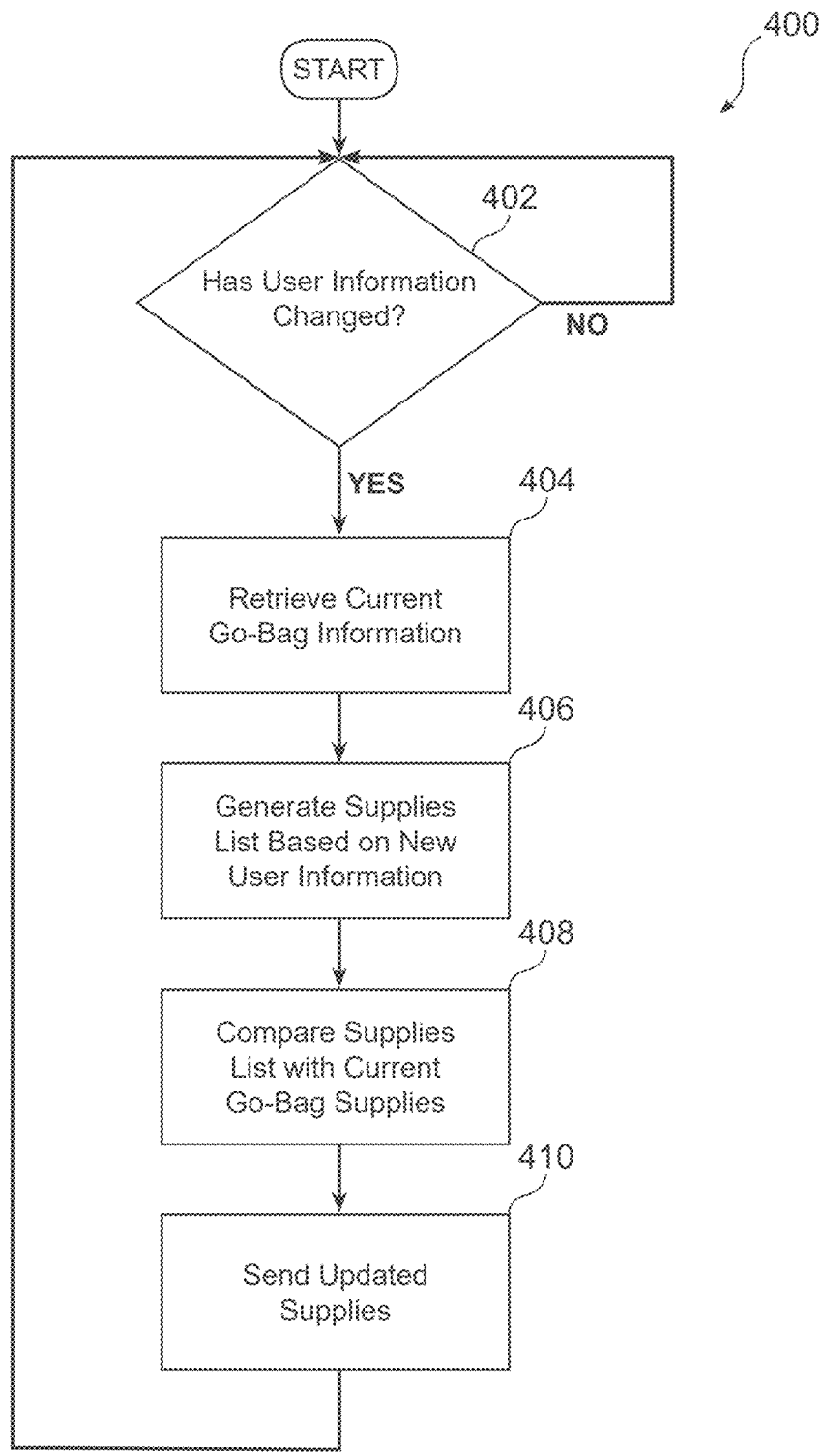
FIG. 4 is a flowchart of a method of updating a go-bag, according to another example embodiment.

Referring now to FIG. 4, a flowchart of a method 400 of updating a go-bag is illustrated according to another example embodiment. In some embodiments, method 400 may be associated with a service, for example, a dynamic go-bag service to update and/or maintain a customized go-bag for a user to use in emergency situations. In an example embodiment, method 400 may be implemented by a computing system that includes at least one processor. In this embodiment, method 400 begins at an operation 402. At operation 402, whether or not any of the user's information has changed is determined. For example, at operation 402, any of the information previously provided by the user (e.g., as part of operation 102 of method 100, described above) may be compared to new information provided by the user (e.g., as part of another iteration or update to operation 102 of method 100).

In some cases, the dynamic go-bag service provider may periodically request that the user confirm and/or update the user's information so that the new information may be used as part of operation 402. In other cases, operation 402 may be triggered based on a user-initiated update or change in the user's information, for example, upon a change in circumstances or situation, the user may access the user information and make changes that trigger implementation of method 400.

Upon determining at operation 402 that the user information has not changed (e.g., the determination at operation 402 is "NO"), then method 400 may proceed back to operation 402 where whether the user's information has changed may be assessed again at some later time. For example, changes to the user's information may be assessed on a predetermined basis, such as a periodic time period (e.g., monthly, quarterly, yearly, etc.), upon initiation by the user, and/or may be assessed based on user information indicative of a change in circumstances associated with the user (e.g., a birth, death, move, job change, etc.).

Upon determining at operation 402 that the user information has changed (e.g., the determination at operation 402 is "YES"), then method 400 proceeds to an operation 404. At operation 404, current information associated with the user's go-bag is retrieved. For example, at operation 404, a list of the current contents of the user's go-bag (e.g., contents 210 of go-bag 205) may be accessed from a database or memory by the service provider. Next, at an operation 406, a list of supplies or items is generated based on the new user information provided at operation 402. In an example embodiment, operation 406 may include generating a complete list of items based on the updated user information.

Next, method 400 may proceed to an operation 408 where the generated list of items based on the updated user information determined at operation 406 is compared with the current contents of the user's go-bag. That is, the contents of the go-bag that the user has been previously provided (e.g., as part of method 100, described above) is compared with the list generated based on the updated user information. Based on the comparison, method 400 proceeds to an operation 410 where the updated supplies or items are sent to the user to include in the user's existing go-bag. For example, the comparison at operation 408 may determine that based on the updated user information, the user has recently added a new family member. As a result, at operation 410, updated supplies or items to be included in the user's go-bag are sent to the user. In the case of a new family member, these updated supplies or items may include extra clothing, additional food and water, baby diapers, etc.

In some embodiments, the updated items or supplies may be sent to the user directly from the service provider (i.e., the dynamic go-bag service). In other embodiments, the updated items or supplies may be sent to the user directly from one or more third-party providers on behalf of the service provider, for example, from retail merchants or other entities that manufacture, distribute, and/or sell various items or supplies that may be included in the user's go-bag. In some embodiments, when the user receives the updated items or supplies for the go-bag as a result of operation 410, the user may update the contents of the user's go-bag with the updated items or supplies. For example, the user may add the updated or new items to contents 210 of go-bag 205, with the updated items or supplies received based on method 400. In other embodiments, operation 410 may include generating and sending the user a new go-bag that includes the updated items or supplies, along with the other contents of the previous go-bag. With this arrangement, a user's go-bag may be automatically maintained or updated by the service provider so that the go-bag remains relevant to the current needs and circumstances of the user.

Additionally, in some embodiments, operation 410 of method 400 may further include providing or sending the user an updated go-bag (i.e., the container to hold the contents of the go-bag), either along with the updated items or as part of a completely updated go-bag. For example, the updated go-bag may be larger in order to hold the updated contents (i.e., additional items and/or supplies may require a larger container than the previous go-bag can accommodate). In other embodiments, the updated go-bag may include additional or different features that would be useful to the user in an emergency situation based on the changes to the user information. For example, the user may move to a new home or residence in a geographic area with a history of flooding, in which case the updated go-bag may include waterproof and/or buoyancy features.

Figure 5:
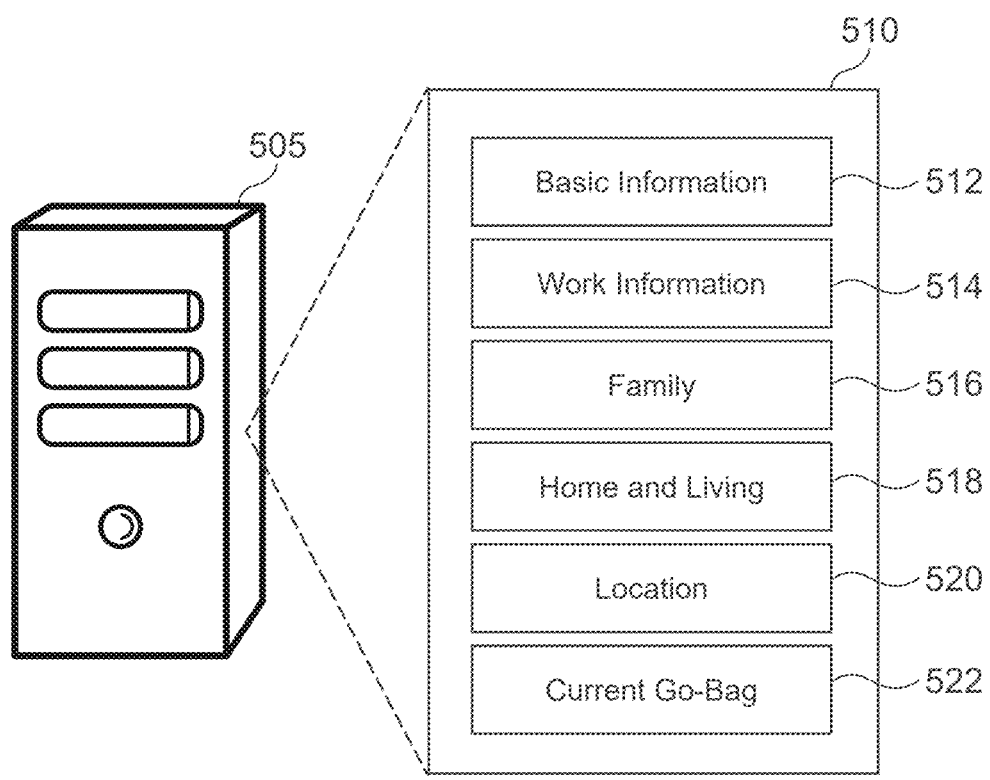
FIG. 5 is a schematic view of an example embodiment of a computing system for implementing a dynamic go-bag service.

FIG. 5 illustrates a schematic view of an example embodiment of a computing system 505 for implementing a dynamic go-bag service. In some embodiments, computing system 505 includes at least one processor that is configured to execute instructions for implementing the techniques according to the example embodiments described herein for providing a dynamic go-bag service. In this embodiment, computing system 505 is in the form of a server including at least one processor. In other embodiments, computing system 505 may include a server, a personal computer, a distributed computing system, or other processing component implemented in hardware, software, or a combination thereof. In some embodiments, computing system 505 may also include a database and/or memory that is in communication with computing system 505 via an internal communication bus and/or externally via a communication network.

In an example embodiment, computing system 505 is configured to store user information 510 associated with a plurality of users of a dynamic go-bag service. In some embodiments, user information 510 may include any information provided by or received from a user in connection with the go-bag service, including information originally provided by the user when setting up the service (e.g., as part of operation 102 of method 100), as well as updated, changed, or modified information provided by a user (e.g., as part of any one or more of operations 302 of method 300 and/or operation 402 of method 400). Additionally, user information 510 may also include other information about a user from one or more publically available databases or sources.

In this embodiment, user information 510 includes for each user of the plurality of users one or more of the following types of information: basic information 512 (e.g., a user's identity or legal name, a username and password, account identifier, gender, age, sex, date of birth, etc.), work information 514 (e.g., a user's employer, job title, industry, work site location, etc.), family information 516 (e.g., number of people in a user's family, family member's ages, names, dates of birth, allergies, medications and/or medicines, medical conditions, pets, etc.), home and living information 518 (e.g., a home or residence address, type of residence or dwelling, number of floors, vehicles, number of people and/or pets at home, etc.), location information 520 (e.g., a geographic area, zip code, state, flood plain information, nearby emergency or evacuation routes, climate type, etc.), and/or current go-bag information 522 (e.g., information associated with one or more go-bags currently in the user's possession, such as a go-bag generated or created as part of method 100, 300, and/or 400 above).

It should be understood that user information 510 illustrated in FIG. 5 is merely exemplary and in various embodiments additional or different information may be included in user information 510. Additionally, user information 510 may be different for each user of the dynamic go-bag service. That is, user information 510 may be personalized or customized to the specifics of a particular user so that a customized go-bag may be generated, created, maintained, updated, modified, and/or replaced that is specific and relevant to the needs and circumstances of each user.

Figure 6:
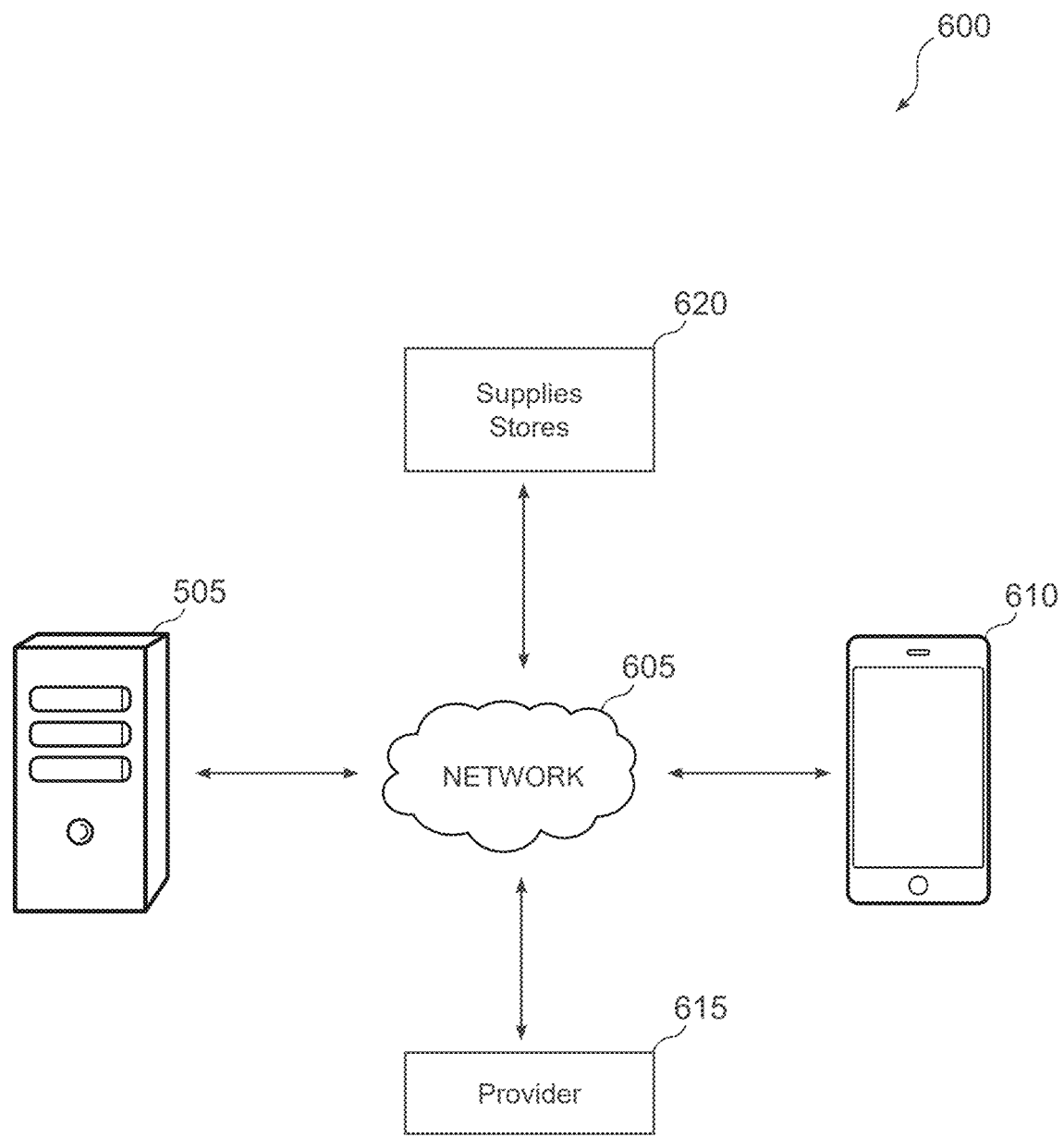
FIG. 6 is a schematic view of an example embodiment of a communication system across a network for a dynamic go-bag service.

Referring now to FIG. 6, a schematic view of an example embodiment of a communication system 600 across a network 605 for a dynamic go-bag service is shown. In this embodiment, communication system 600 includes computing system 505, described above, which is communication with one or more other devices and/or entities through network 605. Network 605 may any communication network that uses any form of wired and/or wireless communication technology, including, but not limited to cellular telecommunication networks (e.g., 3G, 4G, 5G, LTE, etc.) or other wireless wide-area networks (WWAN) and/or wireless local-area networks (WLAN).

In an example embodiment, computing system 505 of dynamic go-bag service provider may use network 605 to communicate with a user through a mobile device 610. Mobile device 610 may be a cellular phone, tablet, computer, or other device including a processor. For example, mobile device 610 may run one or more software applications associated with operations of the dynamic go-bag service described herein. These applications could be native to the mobile device's operating system or web-applications that run on a browser. Moreover, an application may be configured with a graphical user interface (GUI) that facilitates visual and/or tactile interaction between a user and elements of the dynamic go-bag service, including computing system 505. Using mobile device 610, a user may interact with the dynamic go-bag service as described above.

In other embodiments, a user may additionally or alternatively interact with the dynamic go-bag service, including computing system 505, using other mechanisms, including, but not limited to a desktop computer and/or telephone (e.g., public switched telephone network (PSTN)).

As described above, in some embodiments, the dynamic go-bag service provider may use one or more third party providers and/or suppliers to provide updated, replacement, modified, new or original supplies or items for the contents of a user's go-bag. For example, as shown in FIG. 6, computing system 505 may communicate with a provider 615 and/or one or more supplies stores 620 to source any of the items that are provided to the user as contents of the user's go-bag. Additionally, the go-bag itself (e.g., the container holding the contents) may also be provided by provider 615 and/or one or more supplies stores 620. With this arrangement, items to replace and/or update the contents of a user's go-bag may be received directly from the dynamic go-bag service provider or may be sent to the user from provider 615 and/or one or more supplies stores 620, for example, as described above in reference to methods 100, 300 and/or 400.

Figure 7:
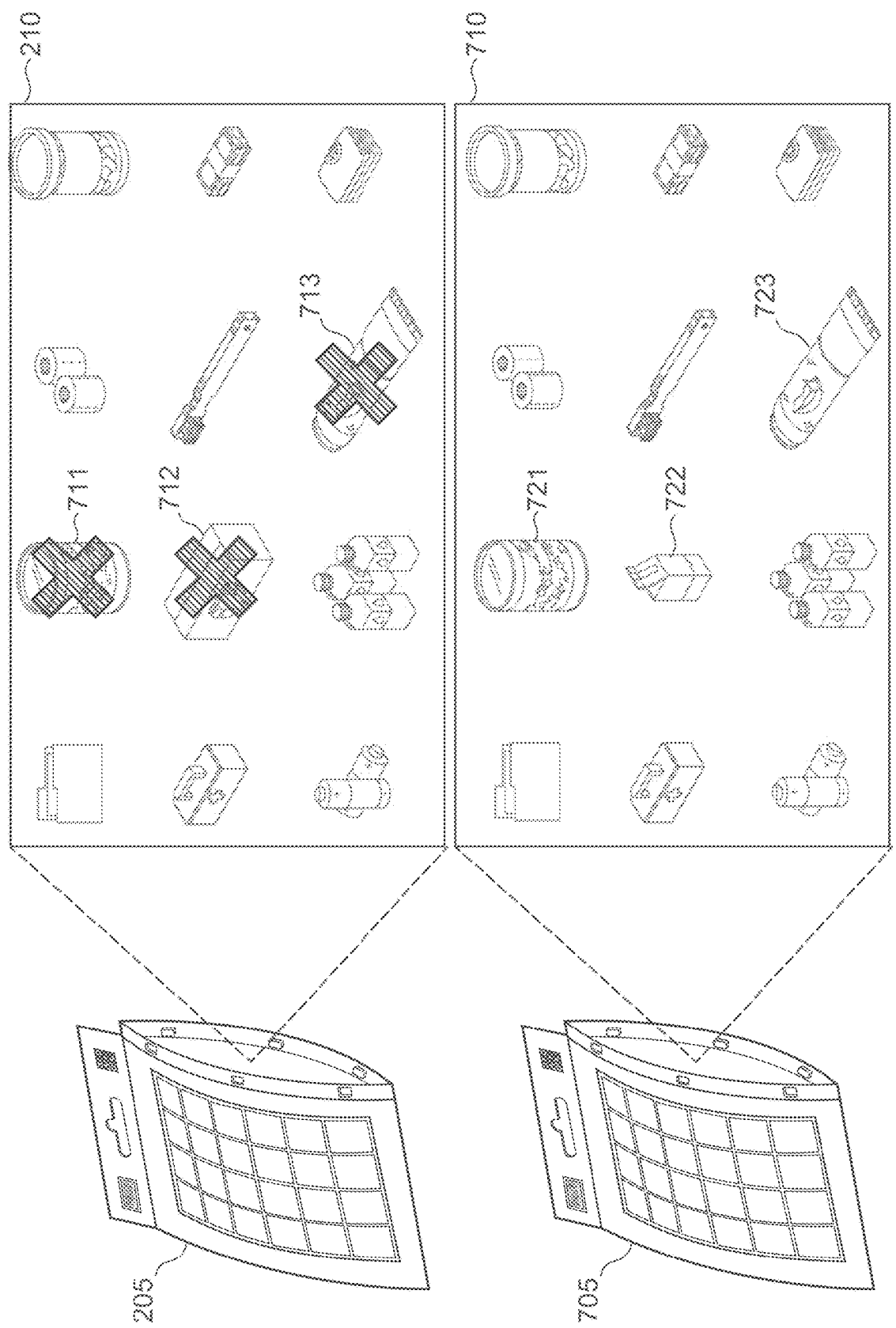
FIG. 7 is a representative view of an example embodiment of a go-bag having updated contents.

Referring now to FIG. 7, a representative view of an example embodiment of a go-bag having updated contents is shown. In some embodiments, the dynamic go-bag service described herein may be used to replace, update, change, or otherwise modify a user's go-bag based on one or more criteria. In this embodiment, representative contents 210 of go-bag 205 are shown. As described above, one or more items of contents 210 of go-bag 205 may be determined to need replacing, updating, modifying, etc. based on updated or changed user information (e.g., as part of methods 100, 300, and/or 400) or based on one or more criteria, as described above. According to the techniques of the example embodiments, contents 210 may be updated, replaced, changed, or otherwise modified in response so that a user is provided with an updated go-bag 705 including updated contents 710.

For example, in this embodiment, a first item 711 (e.g., a canned food item), a second item 712 (e.g., baby diapers), and/or a third item 713 (e.g., toothpaste) included in contents 210 of go-bag 205 are selected for replacement or updating. As described above, one or more of these items may be expired or the user's circumstances may have changed. Accordingly, as shown in FIG. 7, contents 710 of updated go-bag 705 include several updated or replaced items. For example, in this embodiment, first item 711 is replaced with a first replacement item 721 (e.g., a new canned food item), second item 712 is replaced with a second replacement item 722 (e.g., milk or formula), and third item 713 is replaced with a third replacement item 723 (e.g., a new toothpaste).

As described above, one or more of the replacement or updated items (e.g., items 721, 722, 723) may be replaced or updated based on changes in circumstances of the user and/or based on other criteria. For example, first item 711 may be replaced with first replacement item 721 because an expiration date (e.g., a time-based criteria) of the canned food has passed. In another example, second item 712 may be replaced with second replacement item 722 because the user's baby no longer needs diapers but may need milk or formula (e.g., a change in the user's family circumstances). In yet another example, third item 713 may be replaced with third replacement item 723 because the user or someone in the user's family may have developed an allergy to an ingredient in the previous toothpaste (e.g., another example of a change in the user's or user's family circumstances).

Additionally, in some embodiments, go-bag 205 may be replaced with updated go-bag 705. In some cases, updated go-bag 705 may already include all of updated contents 710. In other cases, updated go-bag 705 may be provided separately and the one or more replacement or updated items (e.g., items 721, 722, 723) may also be provided as a group or individually for the user to include with the remaining contents 710 of updated go-bag. In addition, in some embodiments, updated go-bag 705 may be a different size (e.g., to accommodate additional or larger items in contents 710) and/or may include additional or different features (e.g., waterproofing, buoyancy, fireproofing, charging, tracking, etc.), as described above. With this arrangement, the dynamic go-bag service according to the embodiments described herein maintains or updates a user's go-bag to remain relevant to the current needs and circumstances of the user for use in emergency situations.

In some embodiments, a go-bag may be provided with a mechanism configured to track or dynamically update a list of the contents contained within the go-bag. For example, a go-bag may include a radio-frequency identification (RFID) reader that receives information from each item in the contents of the go-bag via associated RFID tags on each item. In other embodiments, a go-bag may include a computer vision object recognition sensor that is configured to identify the items contained in the go-bag based on image analysis. With this arrangement, a go-bag may configured to track and update a list of the contents contained therein. In addition, when one or more items are replaced or updated, the go-bag may use the RFID and/or object recognition sensor to update the list of the contents with the replaced and/or updated items.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of customizing a go-bag for a user, the method comprising:
   receiving user information associated with a user from a mobile device associated with the user;
   generating, by at least one processor, contents specific to the user to use in an emergency situation based on the received user information from the mobile device, the received user information including at least information about the user, the user's family, and the user's home or residence, wherein the contents comprise one or more items;
   placing the contents specific to the user into an interior void of a customized go-bag, the interior void defined by:
      a first side wall including a solar panel disposed on an outer surface of the first side wall and at least two buoyant layers; and
      a second side wall including a buoyant layer and at least one pocket disposed inside the interior void opposite from the at least two buoyant layers of the first side wall, wherein the first side wall and the second side wall are joined along a perimeter to define the interior void of the updated go-bag;
      wherein the first side wall has more buoyant layers than the second side wall to automatically self-orient the updated go-bag in water so that the solar panel is disposed closer to a surface of the water than the second side wall and so that the at least one pocket is disposed beneath the solar panel; and
      wherein, at least a portion of the contents specific to the user are placed in the at least one pocket of the second side wall based upon a weight of one or more of the items.

2. The method according to claim 1, wherein the mobile device is a cellular phone or a tablet.

3. The method according to claim 1, wherein the mobile device is in communication with a dynamic go-bag service provider through a network.

4. The method according to claim 3, wherein the mobile device is configured to run an application associated with the dynamic go-bag service provider.

5. The method according to claim 4, wherein the application includes a graphical user interface (GUI) that facilitates visual or tactile interaction between the user and the dynamic go-bag service provider.

6. The method according to claim 1, further comprising:
   updating or maintaining the customized go-bag by providing one or more replacement items to the user that are configured to replace items included in the contents of the customized go-bag previously provided to the user.

7. The method according to claim 6, wherein updating or maintaining the customized go-bag includes providing the one or more replacement items to the user separately from the go-bag.

8. The method according to claim 7, wherein the one or more replacement items are sent directly to the user from a supply store.

9. The method according to claim 6, wherein updating or maintaining the customized go-bag includes providing an updated go-bag to the user, wherein the updated go-bag includes the one or more replacement items.

10. The method according to claim 6, wherein updating or maintaining the customized go-bag includes determining whether a time-based criteria associated with one or more items included in the contents of the customized go-bag previously provided to the user has passed.

11. A system for customizing a go-bag for a user, the system comprising:
   a mobile device associated with a user;
   a computing system associated with a dynamic go-bag service provider, the computing system including at least one processor;
   the at least one processor in communication with the mobile device over a communication network;
   wherein the at least one processor is configured to:
      receive user information from the mobile device associated with the user through the communication network, including information about the user, the user's family, and the user's home or residence;
      based on the received user information from the mobile device, determine contents specific for the user to use in an emergency situation to include in a customized go-bag for the user; and
   a customized go-bag comprising: a first side wall and a second side wall joined along a perimeter to define an interior void of the go-bag; the first side wall including a solar panel disposed on an outer surface of the first side wall, the first side wall also including at least two buoyant layers; the second side wall including at least one pocket disposed on the second side wall inside the interior void, the second side wall also including a buoyant layer; wherein the at least one pocket on the second side wall is disposed opposite from the at least two buoyant layers of the first side wall; wherein the first side wall has more buoyant layers than the second side wall to automatically self-orient the go-bag in water so that the solar panel is disposed closer to a surface of the water than the second side wall and so that the at least one pocket is disposed beneath the solar panel;
   wherein the interior void of the customized go-bag includes the contents specific for the user to use in an emergency situation.

12. The system according to claim 11, wherein the mobile device is a cellular phone or a tablet.

13. The system according to claim 11, wherein the mobile device is configured to run an application associated with the dynamic go-bag service provider.

14. The system according to claim 13, wherein the application includes a graphical user interface (GUI) that facilitates visual or tactile interaction between the user and the dynamic go-bag service provider.

15. The system according to claim 11, wherein the processor is further configured to:

update or maintain the customized go-bag by providing one or more replacement items to the user that are configured to replace items included in the contents of the customized go-bag previously provided to the user.

16. The system according to claim 15, wherein the at least one processor is configured to update or maintain the customized go-bag by providing the one or more replacement items to the user separately from the go-bag.

17. The system according to claim 15, wherein the at least one processor is configured to update or maintain the customized go-bag by providing an updated go-bag to the user, wherein the updated go-bag includes the one or more replacement items.

18. The system according to claim 15, wherein the at least one processor is configured to update or maintain the customized go-bag by determining whether at least one of: (i) a time-based criteria associated with one or more items included in the contents of the customized go-bag previously provided to the user has passed; or (ii) the user has experienced a change in circumstances.

19. The system according to claim 11, wherein the customized go-bag is manufactured at a first location; and wherein the contents specific for the user to use in an emergency situation are placed into the interior void of the customized go-bag at a second location that is different from the first location.

20. The system according to claim 11, wherein the at least one processor is further configured to provide an updated go-bag for the user, wherein the updated go-bag is larger than the customized go-bag.

\* \* \* \* \*